(12) United States Patent
McCann et al.

(10) Patent No.: US 8,327,697 B2
(45) Date of Patent: Dec. 11, 2012

(54) WHEEL SPEED SENSING SYSTEM AND METHOD

(75) Inventors: Gerry O. McCann, Dunlap, IL (US); Jesse C. Anderson, Monticello, IL (US); Aaron F. Clay, Chillicothe, IL (US); Keith F. Harvey, Peoria, IL (US); Keith A. Kabrick, Springfield, IL (US); Alice L. Kim, Dunlap, IL (US); Daniel T. Wilhelm, Chillicothe, IL (US); Daniel P. Sergison, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 145 days.

(21) Appl. No.: 12/901,635

(22) Filed: Oct. 11, 2010

(65) Prior Publication Data

US 2011/0089655 A1    Apr. 21, 2011

Related U.S. Application Data

(60) Provisional application No. 61/251,987, filed on Oct. 15, 2009.

(51) Int. Cl.
*G01M 17/013* (2006.01)

(52) U.S. Cl. .................................. 73/115.08; 73/115.07
(58) Field of Classification Search .............. 73/115.08, 73/115.07
See application file for complete search history.

(56) References Cited

U.S. PATENT DOCUMENTS

| 3,473,120 | A | * | 10/1969 | Ruof | 324/162 |
|---|---|---|---|---|---|
| 3,600,617 | A | * | 8/1971 | Frayer | 310/156.71 |
| 3,934,685 | A | | 1/1976 | Jovick | |
| 3,944,864 | A | * | 3/1976 | Jovick | 310/168 |
| 5,291,130 | A | * | 3/1994 | Kendzior | 324/174 |
| 6,675,640 | B2 | * | 1/2004 | Ehrlich et al. | 73/115.08 |
| 7,394,242 | B2 | * | 7/2008 | Pradier et al. | 324/174 |
| 8,087,831 | B2 | * | 1/2012 | Sakamoto et al. | 384/544 |
| 2001/0030466 | A1 | | 10/2001 | Ehrlich et al. | |
| 2001/0052258 | A1 | * | 12/2001 | Ehrlich et al. | 73/118.1 |
| 2002/0005780 | A1 | | 1/2002 | Ehrlich et al. | |
| 2007/0006650 | A1 | * | 1/2007 | Pradier et al. | 73/488 |

FOREIGN PATENT DOCUMENTS

| JP | 06242133 | 9/1994 |
|---|---|---|
| JP | 08334529 | 12/1996 |
| JP | 2003215146 | 7/2003 |
| KR | 1020060007552 | 1/2006 |
| KR | 1020080087473 | 10/2008 |

* cited by examiner

*Primary Examiner* — Freddie Kirkland, III

(74) *Attorney, Agent, or Firm* — Miller, Matthias & Hull

(57) ABSTRACT

An improved speed sensing system is disclosed for a machine, such as a truck, that has an axle with an end and an axis. The machine further includes a sensor non-rotatably coupled to the end of the axle and coaxial with the axis. A wheel hub is rotatably coupled to the axle and a wheel cover is coupled to the wheel hub. The machine further includes a magnet coaxially disposed with the axis and coupled to the wheel cover for rotation about the axis as the wheel rotates. The sensor generates signals based on the rotational speed of the magnet and the wheel. For non-rotating axles that are solid or include solid spindles, a passageway for a communication line between the sensor and electronic control module (ECM) may be easily drilled thereby making the disclosed system easy to add to an existing machine or vehicle.

20 Claims, 1 Drawing Sheet

WHEEL SPEED SENSING SYSTEM AND METHOD

CROSS-REFERENCE TO RELATED APPLICATION

This application is a non-provisional application claiming priority under 35 USC §119 (e) to U.S. provisional application Ser. No. 61/251,987 filed on Oct. 15, 2009.

TECHNICAL FIELD

This disclosure relates generally to a system and method for sensing the speed of a wheel of a vehicle. More specifically, disclosed systems and methods are particularly adaptable for sensing the speed of a non-driven wheels of a vehicle for input to an electronic control module (ECM) of an anti-lock braking system (ABS) and traction control systems (TCS).

BACKGROUND

Anti-lock braking systems (ABS) typically include some means for sensing wheel speed. ABS systems for air-braked trucks generally include an electronic control module (ECM), a pneumatic control module (PCM) and one or more wheel speed sensors. The wheel speed sensors provide wheel speed information to the ECM and the ECM signals the PCM to modify air pressure level at the brake chambers. This whole process controls the braking level so that the wheels continue to rotate, or at least rotate most of the time, even during heavy braking. The terms hydraulic control module (HCM) or hydraulic control unit (HCU) are more commonly used for larger vehicles with hydraulic brakes.

The wheel speed input is usually in the form of electrical signals indicative of the angular velocity of the wheel. These signals are generally derived from a stationary variable reluctance (VR) sensor coupled to the axle and a toothed or notched "tone wheel" which rotates with the wheel relative the magnet. As the tone wheel passes the sensor, the resulting variations in magnetic flux produce a signal, the frequency of which is a function of the angular velocity of the wheel.

Typically, the VR sensor is mounted on the axle and a sensor coupling wire connects the electromagnetic sensor with the ABS or, more specifically, the ECM of the ABS. For heavy duty vehicles with solid axles, the connecting wire between the sensor and ECM must be disposed exterior to the axle and spindle. Therefore, the addition of an ABS system to these vehicles is relatively expensive because a costly modification to the wheel/axle assembly is required The stationary magnetic sensor is mounted to the end of the spindle. The tone wheel or magnetic ring is mounted within the wheel cover or hub cap rather than within the wheel housing so that only the cover needs be removed to allow access to the tone wheel and sensor. However, placing the tone wheel immediately inside the wheel cover leaves the tone wheel vulnerable to accidental damage when the wheel cover is removed during normal axle maintenance. Further, the accuracy of the sensor depends on maintaining the gap between the sensor and the tone wheel throughout wheel rotation. Maintaining the sensor-tone wheel gap increases the cost of manufacturing and maintenance costs associated with this type of wheel speed sensing system.

For example, bearing adjustment of the wheel determines how precisely the wheel hub is constrained in an axial direction. As a result, if the bearing adjustment varies, the wheel hub can move axially in service thereby affecting the spacing or gap between the tone wheel and the electromagnetic sensor. Variances and the spacing between the tone wheel and electromagnetic sensor can result in ECM not operating optimally thereby affecting the performance of the ABS. If the spacing discrepancy becomes severe, the ECM may determine that the signal is unusable and ABS may shut down.

Another issue with the prior art sensing systems is that the signal is sensitive to any wobble or "run-out" of the tone wheel and/or the wheel hub. If the plane of the face of the tone wheel is not perpendicular to the axis of rotation, the gap between the tone wheel face and the electromagnetic sensor varies as the tone wheel rotates. This variation causes effects similar to the loose bearing adjustment noted above.

Therefore, in general, wheel speed sensors for ABS systems require a relative rotation between one element such as a toothed ring or tone wheel and a stationary element in the form of an electromagnetic sensor. Coupling wires are needed to carry the signal from the electromagnetic sensor back to the ECM. Because coupling wires are needed between the sensor and the ECM, in practice, the electromagnetic sensor is stationary and the toothed ring or tone wheel rotates. This basic design is not only expensive to install, particularly if the wires from the sensor to the ECM run outside the axle, it is also relatively expensive to maintain and can be prone to inaccurate measurements between maintenance sessions. A less expensive and more reliable system is needed.

SUMMARY OF THE DISCLOSURE

In one example, a machine is disclosed that includes an axle having an end and an axis. The machine further includes a sensor that is coupled to the end of the axle of the axle and that is coaxial with the axis. A wheel hub is rotatably coupled to the axle and a wheel cover is coupled to the wheel hub. The machine further includes a magnet coaxially disposed with the axis and coupled to the wheel cover.

In another example, a vehicle is disclosed that includes an electronic control module (ECM). The vehicle further includes a non-rotating axle having an end and a longitudinal axis. A sensor is coaxially disposed with the axis and coupled to the end of the axle. A wheel hub is rotatably coupled to the axle so the wheel hub rotates about the axis and a wheel cover is coupled to the wheel hub. The vehicle further includes a magnet that is coaxially disposed with the axis of the axle and coupled to the wheel cover. The axle includes a passageway that extends inward from the sensor that accommodates an electrical connection between the sensor and the ECM.

A method of sensing a rotational speed of a wheel mounted on a non-rotating axle of a vehicle is also disclosed. The vehicle includes an electronic control module (ECM). The non-rotating axle includes an end, an axis and an internal passageway. A sensor is coupled coaxially with the axis to the end of the axle. A wheel hub is rotatably coupled to the axle so the wheel hub rotates about the axis. A wheel cover is coupled to the wheel hub and a magnet is supported coaxially with the axis and coupled to wheel cover. The method includes: coupling the sensor to an electronic control module (ECM) with a line that extends through the internal passageway of the axle and provides communication between the ECM and sensor; rotating the wheel and the magnet about the axis; generating a signal at the sensor based on the rotational speed of the magnet; and communicating the signal to the ECM along the line.

DETAILED DESCRIPTION

Figure 1:
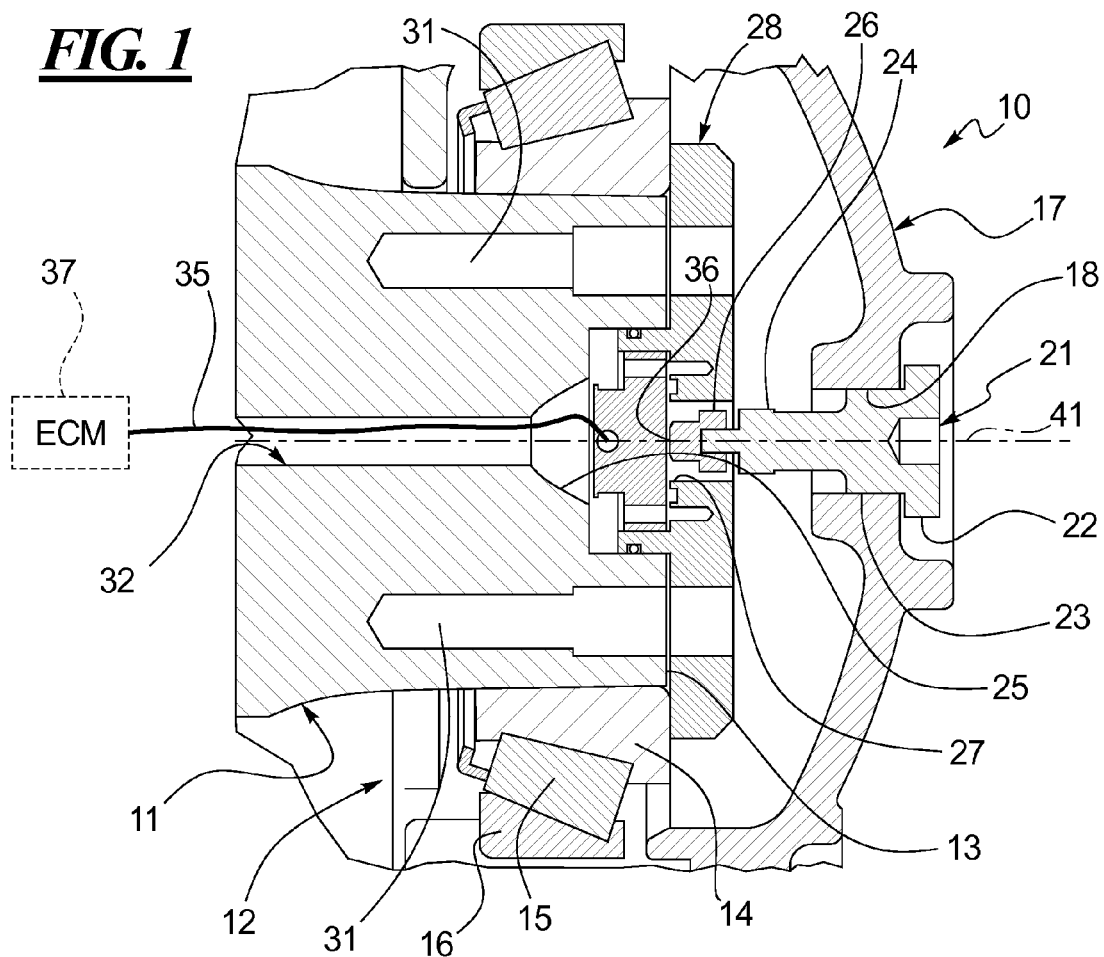
FIG. 1 is a partial sectional view of a disclosed rotational speed sensing system.

Referring to FIG. 1, a wheel speed sensing system 10 is illustrated. An axle 11 is rotatably coupled to a hub 12 by a bearing assembly that, in the embodiment illustrated in FIG. 1, includes a bearing cone 14, an outer bearing 15 and a bearing cup 16. The terms "coupling" or "couple" will be used to refer to any connection between two elements that may be direct, indirect with an intervening part or element, a connection between two elements of a fixed (e.g., non-rotating) nature or a connection between two elements where at least one of the elements can rotate with respect to the other element.

Returning to FIG. 1, the distal end 13 of the axle 11 is received in the bearing cone 14. The bearing cone 14 supports an outer bearing 15 which, in turn, is disposed within a bearing cup 16. The bearing cup 16 may be coupled to the hub 12 while the bearing cone 14 may be coupled to the axle 11. Obviously, other bearing arrangements then that shown at 14-16 for rotatably coupling a wheel hub 12 to an axle 11 may be employed. A wheel cover or hub cap 17 may be coupled directly or indirectly to the hub 12.

The wheel cover 17 may include a central opening 18 through which a member 21 may pass. The member 21 may include a flanged head 22, a threaded shaft portion 23, a middle shaft portion 24 and a distal end 25, which may be coupled to a dipole magnet 26. In the embodiment illustrated in FIGS. 1 and 2, the dipole magnet 26 is disposed within a central opening 27 of the retainer 28. The retainer 28 may be fixedly coupled to the axle 11 by a plurality of fasteners shown at 31.

Figure 2:
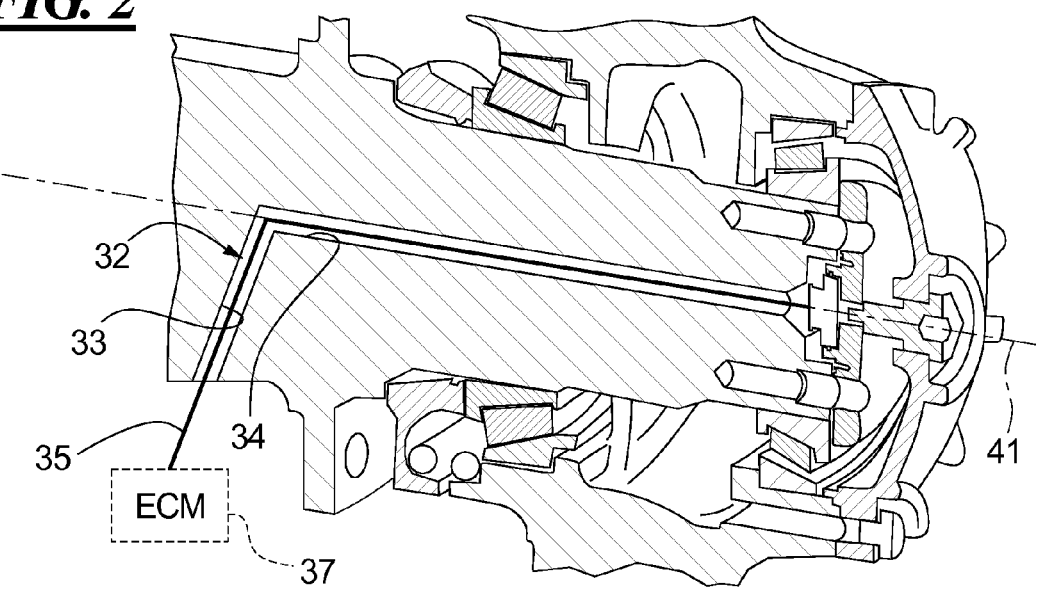
FIG. 2 is another sectional view of the rotational speed sensing system illustrated in FIG. 1, further illustrating the internal passageway through the axle for coupling the sensor to the ECM.

The axle 11 includes a passageway 32 that may be rifled drilled in two segments 33, 34 as shown in FIG. 2. The segment 34 may extend axially through the distal end 13 of the axle 11 along the axis 41 of the axle 11 and the segment 33 may extend radially outward from the axis 41. The passageway 32 accommodates a line 35 that may be in form of a wire, fiber or lead that connects the sensor 36 to the ECM 37. As explained below, the sensor 36 is an electromagnetic sensor because of the use of the dipole magnet 26. The sensor 36 may be sandwiched between the retainer 28 and the axle 11.

As the hub 12, wheel cover 17 and, accordingly, the dipole magnet 26 rotate about the longitudinal axis 41 of the axle 11, the magnetic field through the sensor 36 also rotates. The sensor 36 determines the direction of the magnetic field and sends a signal to the ECM 37 via the line 35. The change in direction of the magnetic field through the sensor 36 is directly proportional to wheel speed. The signal sent to the ECM 37 by the sensor 36 is a pulse train with frequency proportional to the rate of change of direction of the magnetic field at the sensor 36.

Suitable sensors 36 and magnets 26 are available, as will be apparent to those skilled in the art. The non-contact two part design with the magnet 26 space apart from the sensor 36 removes the need for seals or bearings and insurers long-term reliability. Rotation of the magnet 26 is sensed by a custom encoder chip within the body of the sensor 36, and processed to give the desired output format, which may be a pulse train as noted above. The encoder chip (not shown) processes the signals received to provide resolutions to 13 bit (8192 positions per revolution) with operational speeds to 30,000 rpm. Output signals may be provided from the sensor 36 to the ECM 37 in various formats such as industry standard absolute, incremental or analogue.

INDUSTRIAL APPLICABILITY

Various types of vehicles such as trucks, including light and medium trucks, large mining trucks (LMT) and quarry construction trucks (QCT) may be equipped with the wheel speed sensing system 10 disclosed herein. Typically, such vehicles will already include an ECM 37 as such vehicles are typically equipped with ABS or TCS systems. Further, such vehicles typically include at least one non-rotating axle 11 having an end 13 and a longitudinal axis 41. The sensor 36 is coaxially disposed with the axis 41 and coupled to the end 13 of the axle 11. The wheel hub 12 is rotatably coupled to the axle 11 so the wheel hub 12 rotates about the axis and a wheel cover 17 is coupled to the wheel hub 12. The vehicle further includes a magnet 26 that is coaxially disposed with the axis 41 and coupled to the wheel cover 17 so that the magnet 26 rotates with the hub 12 and wheel cover 17. The axle 11 may be easily retrofitted to include a passageway 32 for accommodating a line 35 that provides communication between the sensor 36 and the ECM 37. Specifically, the passageway 32 may include two drilled segments 33, 34, with one segment 34 that extends inward from the sensor 36 along the axis 41 and a second segment 33 that extends radially outward as shown in FIG. 2.

What is claimed is:

1. A machine comprising:
a non-rotating axle having an end and an axis;
a sensor coupled to the end of the axle coaxially with the axis;
a wheel hub rotatably coupled to the axle;
a wheel cover coupled to the wheel hub; and
a magnet axially disposed on the axis and coupled to wheel cover, wherein the magnet is adjacent to the sensor and the sensor and the magnet do not overlap so that no line perpendicular to the axis intersects both the sensor and the magnet.

2. The machine of claim 1, wherein the magnetic flux lines of magnet extend generally perpendicular to the axis.

3. The machine of claim 1, wherein the sensor is non-rotatably coupled to the axle and the magnet is coupled to the wheel cover for rotation with the wheel cover and the wheel hub.

4. The machine of claim 1, wherein the end of the axle is coupled to a retainer, the retainer is disposed between the end of the axle and the wheel cover, the retainer includes a through-opening coaxial with the axis, the magnet is rotatably supported within the through-opening.

5. The machine of claim 1, wherein the wheel cover is coupled to a member, the member extends inwardly towards the axle along the axis, and the magnet is coupled to the member.

6. The machine of claim 1, wherein the axle is coupled to a retainer.

7. The machine of claim 6, wherein the retainer includes a through-opening that is coaxial with the axis and the magnet is rotatably supported within the through-opening of the retainer.

8. The machine of claim 7, wherein the wheel cover is coupled to a member, the member extends inwardly towards the retainer along the axis, the magnet is coupled to the member and rotatably supported in the through-opening of the retainer.

9. The machine of claim 1, wherein the end of the axle is supports a retainer disposed along the axis, and the sensor is disposed between the axle and retainer.

10. The machine of claim 1, wherein the axle includes an internal passageway extends inward from the sensor for accommodating an electrical connection between the sensor and an electronic control module (ECM).

11. A vehicle comprising:
an electronic control module (ECM);
a non-rotating axle having an end and a longitudinal axis;
a sensor coaxially coupled to the end of the axle and coaxial with the axis;
a wheel hub rotatably coupled to the axle so the wheel hub rotates about the axis;
a wheel cover coupled to the wheel hub;
a magnet coupled to the wheel cover and axially disposed on the axis, wherein the magnet is adjacent to the sensor and the sensor and the magnet do not overlap so that no line perpendicular to the axis intersects both the sensor and the magnet; and
the axle includes a passageway that extends inward from the sensor that accommodates an electrical connection between the sensor and the ECM.

12. The vehicle of claim 11, wherein the magnetic flux lines of magnet extend generally perpendicular to the axis.

13. The vehicle of claim 11, wherein the vehicle is a truck that includes an anti-lock braking system (ABS).

14. The vehicle of claim 11, wherein the wheel cover is coupled to member, the member extends inwardly towards the axle along the axis, and the magnet is coupled to the member.

15. The vehicle of claim 11, wherein the axle is coupled to a retainer.

16. The vehicle of claim 15, wherein the wheel cover is coupled to a member, the member extends inwardly towards the retainer along the axis, the retainer includes a through-opening disposed along the axis, the magnet is coupled to the member and is rotatably supported in the through-opening.

17. The vehicle of claim 11, wherein the end of the axle is coupled to a plug and a retainer disposed along the axis, the sensor is disposed between the plug and the retainer.

18. A method of sensing rotational speed of a wheel mounted on a non-rotating axle of a vehicle, the vehicle includes an electronic control module (ECM), the non-rotating axle having an end and an axis, the axle is rotatably coupled a wheel hub so the wheel hub rotates about the axis, the wheel hub is coupled to a wheel cover, the method comprising:
providing an internal passageway in the axle;
coupling a sensor coaxially with the axis to the end of the axle;
coupling a magnet to the wheel cover so that the magnet is axially disposed on the axis, wherein the magnet is adjacent to the sensor and the sensor and the magnet do not overlap so that no line perpendicular to the axis intersects both the sensor and the magnet;
coupling the sensor to an electronic control module (ECM) with a line that extends through the passageway of the axle;
rotating the wheel so that the magnet rotates about the axis;
generating a signal at the sensor relative to the rotational speed of the magnet;
communicating the signal to the ECM.

19. The method of claim 18, further includes coupling the wheel cover to member that extends inwardly towards the axle along the axis and supporting magnet along the axis with the member.

20. The method of claim 18, wherein the vehicle is a truck that includes an anti-lock braking system (ABS).

* * * * *